United States Patent [19]

Itoi et al.

[11] Patent Number: 5,439,961
[45] Date of Patent: Aug. 8, 1995

[54] PROCESS FOR PRODUCING POLYESTER FILM

[75] Inventors: Akito Itoi; Akira Takenaka; Isao Nishi, all of Wakayama, Japan

[73] Assignee: Kao Corporation, Tokyo, Japan

[21] Appl. No.: 86,983

[22] Filed: Jul. 7, 1993

[30] Foreign Application Priority Data

Jul. 14, 1992 [JP] Japan .................................. 4-186617

[51] Int. Cl.⁶ .................... B29C 55/12; B29C 47/00
[52] U.S. Cl. ................... 524/167; 264/210.6; 264/210.7; 264/211; 264/290.2; 264/349; 524/170; 524/171; 524/367; 524/368; 524/370
[58] Field of Search ............... 264/210.2, 210.6, 210.7, 264/211, 349, 290.2; 524/167, 170, 367, 368, 369, 370, 171

[56] References Cited

U.S. PATENT DOCUMENTS

| | | | |
|---|---|---|---|
| 3,546,164 | 12/1970 | Stewart et al. | 524/170 |
| 4,517,315 | 5/1985 | Matsumura et al. | 264/210.2 |
| 4,517,328 | 5/1985 | Schmidt | 524/370 |
| 5,162,091 | 11/1992 | Ishii et al. | 264/210.6 |

FOREIGN PATENT DOCUMENTS

| | | |
|---|---|---|
| 0057387A2 | 8/1982 | European Pat. Off. . |
| 0119554A1 | 3/1984 | European Pat. Off. . |
| 0491947A1 | 7/1992 | European Pat. Off. . |
| 1915999 | 11/1969 | Germany . |
| 48-76944 | 10/1973 | Japan . |
| 55-66949 | 5/1980 | Japan . |
| 55-82150 | 6/1980 | Japan . |

OTHER PUBLICATIONS

Defensive Publication, 926 O.G. 11, T926,008, Sep. 3, 1974, Weaver J. C. "Copolyester Molding Compositions of Improved Processability".

*Primary Examiner*—Mathieu D. Vargot
*Attorney, Agent, or Firm*—Birch, Stewart, Kolasch & Birch

[57] ABSTRACT

A process for producing a polyester film having a high strength and a high modulus of elasticity, which includes preparing a polyester resin composition comprising, adding to a polyester resin, 0.1 to 10 parts by weight, based on 100 parts by weight of the polyester resin, of an additive compound selected from the group consisting of compounds represented by the general formula (I):

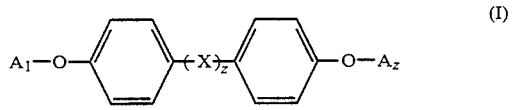

and compounds represented by the following general formula (II):

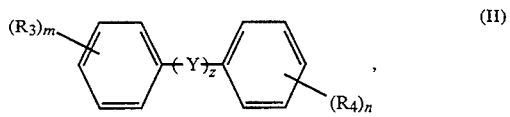

and subjecting the resin composition to monoaxial or biaxial stretching.

16 Claims, No Drawings

PROCESS FOR PRODUCING POLYESTER FILM

BACKGROUND OF THE INVENTION

1. Field of the Invention

The present invention relates to a polyester film having a high strength and a high modulus of elasticity and to a process for producing the polyester film.

2. Description of the Related Art

Polyesters represented by polyethylene terephthalate, poly-1,4-butylene terephthalate, poly-2,6-ethylene naphthalate and the like have been widely used in the form of films, fibers and various moldings by virtue of their excellent mechanical properties and heat resistance.

In recent years, a polyester film having a high strength and a high modulus of elasticity has been eagerly desired particularly in the field of films and magnetic tapes.

Means for preparing a high-strength polyester film or tape are known. For example, a method wherein a low-molecular weight compound is added to a polyester resin to prepare a polyester resin composition is known. This method, however, necessitates the steps of extracting the added low- molecular weight compound after the formation of a film and drying the film thus treated. Therefore, this method is unsatisfactory from the viewpoint of productivity. Japanese Patent Publication-A Nos. 66949/1980 and 82150/1980 disclose a method wherein a liquid crystal compound comprising a carbonate or an ester compound is incorporated into a polyester resin composition. In general, however, when these compounds are melt-mixed with a polyester resin, there is a possibility that they will bring about transesterification with the polyester resin to lower the molecular weight of the polyester resin, so that no increase in the strength of the polyester film or tape produced with the use of the polyester resin composition containing a carbonate or an ester compound can be expected.

Furthermore, European Patent Publication-A No. 0491947 (published on Jul. 1, 1992) and the corresponding U.S. Pat. No. 5,162,091 (published on Nov. 10, 1992, Assignee: Kao Corp.) disclose additive compounds for lowering the melt viscosity of polyethylene terephthalate resins and polyester fiber prepared utilizing the resin composition comprising a polyethylene terephthalate resin and the additive compound. Although the melt viscosity of the resin composition is reduced with the use of the additive compound, the strength of the fiber prepared with the resin composition containing the additive compound is the same as that of the fiber prepared with the resin composition containing none of the additive compounds.

In addition, U.S. Pat. Nos. 3,546,164 (published on Dec. 8, 1970) and 4,517,328 (published on May 14, 1985) and Japanese Patent Publication-A No. 76944/1973 (published on Oct. 16, 1973) disclose polyester resin compositions containing a specific additive.

DISCLOSURE OF THE INVENTION

SUMMARY OF THE INVENTION

Accordingly, the present inventors have made extensive studies with a view toward solving the above-described problems and, as a result, have found that when a polyester film is produced by adding a specified compound to a polyester resin, that is, polyester, molding the mixture thus obtained into a film and subjecting the film to monoaxial or biaxial stretching in a successive or simultaneous manner, a remarkable enhancement in the stretching ratio can be attained as compared with the case where no such compound is added, and furthermore there occurs no lowering in the molecular weight of the polyester resin, which contributes to a significant elevation in the strength of the polyester film, which has led to the completion of the present invention.

Thus, the present invention provides a process for producing a polyester film, which comprises preparing a polyester resin composition comprising or consisting essentially of, adding to a polyester resin, 0.1 to 10 parts by weight, based on 100 parts by weight of the polyester resin, of an additive compound selected from the group consisting of compounds represented by the following general formula (I):

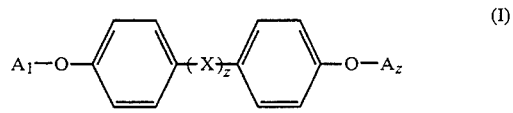
(I)

wherein $A_1$ and $A_2$ each stand for an alkyl or aralkyl group having 6 to 22 carbon atoms, X stands for

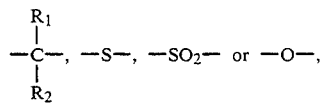

wherein $R_1$ and $R_2$ each stand for a hydrogen atom or an alkyl group having 4 or less carbon atoms, preferably 1 or 2 carbon atoms, and z is 0 or 1, and compounds represented by the following general formula (II):

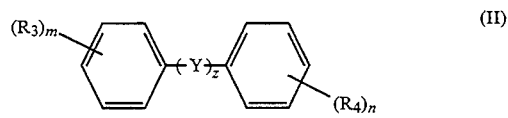
(II)

wherein $R_3$ and $R_4$ each is and for an alkyl group having 6 to 22 carbon atoms, m and n are each an integer capable of satisfying the requirement that $m+n=1$ to 3, Y stands for

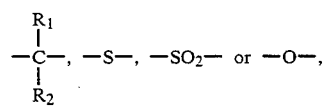

wherein $R_1$ and $R_2$ each stand for a hydrogen atom or an alkyl group having 4 or less carbon atoms, preferably 1 or 2 carbon atoms, and z is 0 or 1, and subjecting the resin composition to monoaxial or biaxial stretching.

Namely, the present invention relates to a process for producing a polyester film, characterized by subjecting a resin composition, which is obtained by adding 0.1 to 10 parts by weight of either a compound represented by the above general formula (I) or a compound represented by the above general formula (II) to 100 parts by weight of a polyester resin, to monoaxial or biaxial stretching.

The present invention also provides a polyester film produced by the above-described process, and a polyester film having a high strength and a high modulus of elasticity which comprises or consists essentially of a polyester resin and 0.1 to 10 parts by weight, based on 100 parts by weight of the polyester resin, of an additive compound selected from the group consisting of compounds represented by the following general formula (I):

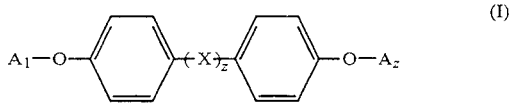

wherein $A_1$ and $A_2$ each stand for an alkyl or aralkyl group having 6 to 22 carbon atoms, X stands for

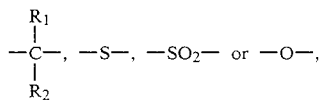

wherein $R_1$ and $R_2$ each stand for a hydrogen atom or an alkyl group having 4 or less carbon atoms, and z is 0 or 1, and compounds represented by the following general formula (II):

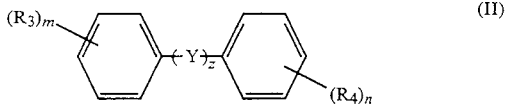

wherein $R_3$ and $R_4$ each stand for an alkyl group having 6 to 22 carbon atoms, m and n are each an integer capable of satisfying the requirement that $m+n=1$ to 3, Y stands for

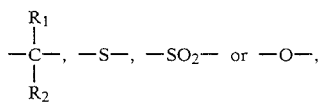

wherein $R_1$ and $R_2$ each stand for a hydrogen atom or an alkyl group having 4 or less carbon atoms, and z is 0 or 1.

Further scope and [the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent .to those skilled in the art from this detailed description.

DETAILED DESCRIPTION OF THE INVENTION

In the present invention, :the additive compound is one member selected from the group consisting of compounds represented by the above general formula (I) and compounds represented by the above general formula (II).

In the general formula (I) according to the present invention, $A_1$ and $A_2$ are each a straight-chain or branched alkyl groups:or an aralkyl group having a straight-chain or branched alkyl group, and the number of carbon atoms of each of $A_1$ and $A_2$ is from 6 to 22 and can be arbitrarily selected within the range. When the number of carbon atoms of each of $A_1$ and $A_2$ is less than 6, the molecular weight of the compound represented by the general formula (I) is so low that boiling often occurs at the melting temperature of a resin composition containing the compound, which gives rise to foaming. On the other hand, when the number of carbon atoms exceeds 22, the compatibility of the compound with the resin becomes iso poor that the effect obtained by incorporating the compound into the resin is unsatisfactory. The number of carbon atoms of each of $A_1$ and $A_2$ is still preferably 8 to 18.

Specific examples of $A_1$ and $A_2$ include straight-chain alkyl groups such;as n-hexyl, n-octyl, n-dodecyl and n-octadecyl groups, branched alkyl groups such as 2-hexyldecyl and methyl-branched octadecyl groups, and aralkyl groups such as benzyl and 2-phenylethyl groups.

In the general formula (I) according to the present invention, X stands for

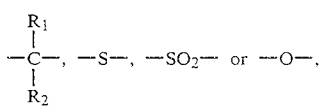

wherein $R_1$ and $R_2$ each stand for a hydrogen atom or an alkyl group having 4 or less carbon atoms, for example, 1 or 2 carbon atoms. Specific examples of $R_1$ and $R_2$ include straight-chain or branched alkyl groups such as methyl, ethyl, n-propyl, isopropyl, n-butyl, isobutyl, sec.-butyl and t-butyl groups.

In the general formula (I) according to the present invention, z is 0 or 1. When z is 0, the compound represented by the general formula (I) is a compound containing a biphenyl part in the molecule.

The compound represented by the general formula (I) according to the present invention can be easily prepared by reacting an aromatic glycol represented by the general formula (III):

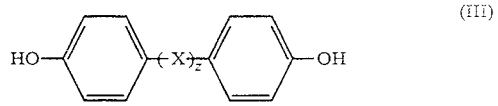

wherein X and z are as defined above, with an alkyl halide and/or an aralkyl halide each having 6 to 22 carbon atoms, in the presence of an alkali catalyst such as NaOH or KOH.

Specific examples of the compounds represented by the general formula (I) according to the present invention include the following compounds:

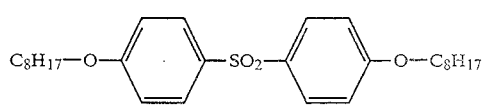

(hereinafter abbreviated to invention compound (1)),

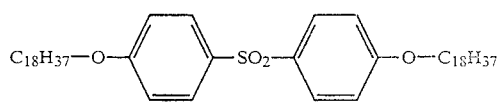

(hereinafter abbreviated to invention compound (2)),

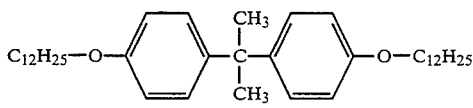

(hereinafter abbreviated to invention compound (3)),

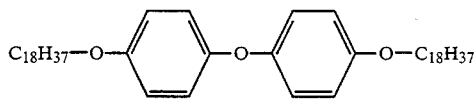

(hereinafter abbreviated to invention compound (4)),

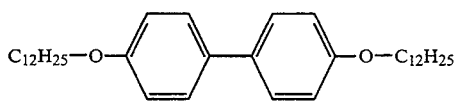

(hereinafter abbreviated to invention compound (5)), and

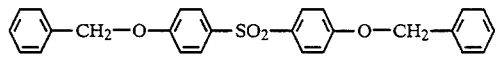

(hereinafter abbreviated to invention compound (6)).

In the general formula (II) according to the present invention, $R_3$ and $R_4$ each are a straight-chain or branched alkyl group, and the number of carbon atoms is from 6 to 22 and can be arbitrarily selected within the range. When the number of carbon atoms of $R_3$ or $R_4$ is less than 6, the molecular weight of the compound represented by the general formula (II) is so low that boiling often occurs at the melting temperature of the resin composition containing the compound, which gives rise to foaming. On the other hand, when the number of carbon atoms exceeds 22, the compatibility of the compound with a resin becomes so poor that the effect obtained by incorporating the compound into the resin is unsatisfactory. The number of carbon atoms of each of $R_3$ and $R_4$ is still preferably 8 to 18.

Specific examples of $R_3$ and $R_4$ include hexyl, octyl, dodecyl and octadecyl groups.

The total number of $R_3$ and $R_4$, that is m+n in the general formula (II), is 1 to 3. When m+n is 0, the molecular weight of the compound represented by the general formula (II) is so low that boiling often occurs at the melting temperature of the resin composition containing the compound, which gives rise to foaming. On the other hand, when m+n is 4 or more, the compatibility of the compound with the resin becomes so poor that the effect obtained by incorporating the compound into the resin is unsatisfactory.

In the general formula (II) according to the present invention, Y is the same as X in the general formula (I), and z is the same as that of the general formula (I).

In the general formula (II), Y preferably stands

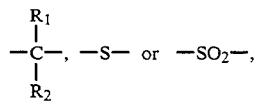

wherein $R_1$ and $R_2$ each stand for a hydrogen atom or an alkyl group having 4 or less carbon atoms, and z is 0 or 1. Alternatively, Y preferably stands for

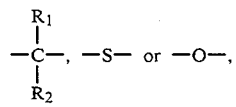

wherein $R_1$ and $R_2$ each stand for a hydrogen atom or an alkyl group having 4 or less carbon atoms, and z is 0 or 1 in the general formula (II). In the general formula (II), Y still more preferably stands for

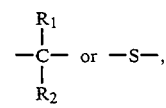

wherein $R_1$ and $R_2$ each stand for a hydrogen atom or an alkyl group having 4 or less carbon atoms, and z is 0 or 1.

When Y in the general formula (II) stands for —$SO_2$—, $R_3$ and $R_4$ in the general formula (II) each stand for preferably an alkyl group having 9 to 22 carbon atoms and still more preferably an alkyl group having 10 to 22 carbon atoms.

The compound represented by the general formula (II) according to the present invention can be easily prepared by known methods. For example, it can be prepared by reacting biphenyl, diphenyl ether, diphenyl sulfide or the like with an α-olefin having 6 to 22 carbon atoms in the presence of a catalyst such as aluminum chloride or boron trifluoride ethyl ether.

Specific examples of the compounds represented by the general formula (II) according to the present invention include the following compounds:

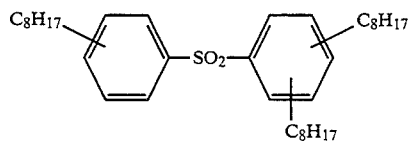

(hereinafter abbreviated to invention compound (7)),

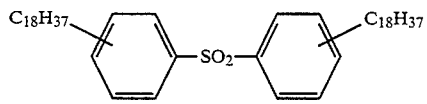

(hereinafter abbreviated to invention compound (8)),

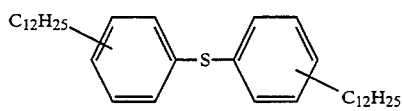

(hereinafter abbreviated to invention compound (9)), and

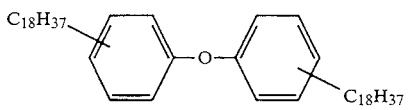

(hereinafter abbreviated to invention compound (10)).

The compound represented by the above general formulas (I) or (II), that is the additive compound according to the present invention, can be homogeneously mixed with the polyester resin and, in most cases, brings about neither fuming nor coloration even when exposed to a high temperature during melt molding, that is, is excellent in heat resistance.

The addition of the additive compound according to the present invention lowers the melt viscosity of the polyester, as disclosed in European Patent Publication-A No. 0491947 described above, but does not cause the reduction of the molecular weight of the polyester. Therefore, it has the effect of improving the moldability of a high-molecular weight polyester which has hitherto been difficult to use, which contributes to an increase in the productivity. Further, it is also effective in increasing the strength of the polyester film through an enhancement in the molecular weight of the polyester to be used as the starting material. Furthermore, since it lowers the melt viscosity of the polyester, it is useful for improving the thin film moldability and surface smoothness.

In addition, since the additive compound used in the present invention has a good compatibility with the polyester, when the polyester resin composition containing the additive compound is utilized to prepare, for example, a magnetic tape, neither bleedout nor dropout occurs.

In the present invention, in order to enhance the strength of the polyester film produced with the resin composition containing the additive compound, it is necessary to add the additive Compound in an amount of 0.1 to 10 parts by weight, preferably 0.5 to 8 parts by weight and still preferably 1 to 5 parts by weight, to 100 parts by weight of the polyester resin as the raw material. When the amount of addition is less than 0.1 part by weight, the effect of the addition can be hardly expected. On the other hand, when it exceeds 10 parts by weight, the properties of the film are adversely affected.

The additive compound may be added in the course of the production of the polyester resin or in a suitable step after its production. The addition thereof after production may be conducted by previously melt blending them on a single-screw extruder, a twin-screw extruder, an open roll, a kneader, a mixer or the like, or dry blending them and then molding the mixture thus obtained into a film.

Examples of the polyester resins to be used in the present invention include polyethylene terephthalate, poly-1,4-butylene terephthalate, polyethylene 2,6-naphthalate, polycyclohexanedimethanol terephthalate, poly-1,4-butylene biphenyl-4,4'-dicarboxylate, poly-1,3-propylene terephthalate and poly-1,6-hexylene terephthalate, among which polyethylene terephthalate, poly-1,4-butylene terephthalate and polyethylene 2,6-naphthalate are preferably used. These polyesters may be copolyesters which contain other dicarboxylic acid and/or glycol copolymerized therein usually in an amount of 30% by mole or less.

When the additive compound is one represented by the general formula (II) wherein Y stands for —O— and z is 1, the polyester resin is preferably selected among polyethylene terephthalate, poly-1,4-butylene terephthalate, polyethylene 2,6-naphthalate, polycyclohexanedimethanol terephthalate, poly-1,4-butylene biphenyl-4,4'-dicarboxylate, poly-1,3-propylene terephthalate and poly-1,6-hexylene terephthalate.

Examples of the dicarboxylic acids as the comonomer include aromatic dicarboxylic acids, such as terephthalic acid, isophthalic acid, 1,5-, 1,6-, 1,7-, 2,6- and 2,7-naphthalenedicarboxylic acids, biphenyl-4,4'-dicarboxylic acid, phthalic acid, dibromoisophthalic acid, sodium sulfoisophthalate, diphenyl ether dicarboxylic acid, diphenyl sulfone dicarboxylic acid, diphenyl ketone dicarboxylic acid, diphenoxyethanedicarboxylic acid and phenylenedioxydiacetic acid; aliphatic dicarboxylic acids, such as adipic acid, sebacic acid, succinic acid, glutaric acid, piperic acid, suberic acid, azelaic acid, undecanedioic acid and dodecanedioic acid; alicyclic dicarboxylic acids, such as cyclohexanedicarboxylic acid; and a mixture of two or more of these acids.

Examples of the glycols as the comonomer include aliphatic glycols, such as ethylene glycol, trimethylene glycol, tetramethylene glycol, pentamethylene glycol, hexamethylene glycol, octamethylene glycol, decamethylene glycol, propylene glycol, neopentyl glycol, diethylene glycol and polyethylene glycol, alicyclic glycols; aromatic glycols, such as o-, m- and p-xylene glycols and 2,2-bis(4-hydroxyethoxyphenyl)propane; alicyclic glycols such as cyclohexanedimethanol; and a mixture of two or more of these glycols.

Further, the polyester resin used in the present invention may contain a hydroxy carboxylic acid such as glycolic acid, hydroxybenzoic acid and hydroxynaphthoic acid, and/or a diphenol such as hydroquinone, resorcinol, dihydroxybiphenyl and dihydroxy diphenyl ether as the comonomer.

The molecular weight of the polyester resin is preferably 0.7 or more, for example 0.7 to 1.2, in terms of intrinsic viscosity (hereinafter abbreviated to "$[\eta]$") at 25° C. in phenol/tetrachloroethane (weight ratio of 60:40). When the $[\eta]$ is less than 0.7, the strength of the film sometimes becomes unsatisfactory.

The resin composition as the raw material of the film according to the present invention comprises the polyester resin described above and 0.1 to 10 parts by weight, based on 100 parts by weight of the polyester resin, of the additive compound described above. If necessary, various additives other than the additive compound according to the present invention, for example, oxidation stabilizers, release agents, ultraviolet absorbers, antistatic agents, flame retardants and crystallization accelerators, may be incorporated into the resin composition in such an amount as will not be detrimental to the effect of the present invention. Further, it is also possible to add and incorporate organic or inorganic polymers or low-molecular weight fine particles for the purpose of improving the travelling property and abrasion resistance of the film.

The process for producing a polyester film according to the present invention can be conventional. For example, use may be made of a process which comprises melt-extruding a resin composition comprising a polyester resin and, added thereto, a compound represented by the general formulas (I) or (II) at 270° to 320° C. into a sheet or film, cooling the same to 40° to 80° C. to effect solidification to thereby render the same amorphous, subjecting the amorphous sheet or film to monoaxial or biaxial stretching in a successive or simultaneous manner at 80° to 140° C., preferably at 90° to 110° C., in the longitudinal and lateral directions in an areal ratio of 4 to 30, and heat-treating the stretched sheet or film at 160° to 250° C. (for example, a process described in Japanese Patent Publication-B No. 5639/1955).

The stretching in tile longitudinal and lateral directions may be conducted each at one stage, or if necessary, it may be conducted at a plurality of stages and it is also possible to provide a heat treatment stage in the course of the multi-stage stretching for the relaxation of orientation. Further, stretching may be again conducted after the completion of the biaxial stretching and before the initiation of the next processing step, that is, the step of heat treatment The restretching may be conducted in either or both the longitudinal and lateral directions.

In the process for producing a polyester film according to the present invention, when, for example, an amorphous film having an $[\eta]$ value of 0.8 dl/g is subjected to biaxial stretching at 90° C., the areal stretching ratio is preferably 14 or more, still more preferably 14 to 30, although it somewhat varies depending upon the $[\eta]$ value of the polyester used and the stretching conditions (temperature, stretching method and stretching rate). In general, the areal stretching ratio is preferably 9 or more, still more preferably 9 to 30.

The areal stretching ratio is the product of the stretching ratios of the longitudinal and lateral directions.

The areal stretching ratio is determined as follows: An unstretched film is marked at intervals of 1 cm in both the longitudinal and lateral directions. After stretching the film, the intervals of the marks are measured and the stretching ratios of the longitudinal and lateral directions are calculated respectively.

In the case of the simultaneous biaxial stretching, the areal stretching ratio is given as follows:

The areal stretching ratio =

$$\left( \frac{\text{Interval between the marks of the film after stretching}}{\text{Interval between the marks of the film before stretching}} \right)^2$$

According to the present invention, a high-strength film is produced by adding a compound represented by the above general formulas (I) or (II) to a polyester resin, molding the mixture thus obtained into a film and stretching the film. Although the mechanism through which the high strength is developed has not yet been elucidated, it is conceivable that the addition of the compound represented by the above general formulas (I) or (II) to the polyester resin contributes to an improvement in the stretchability of the film, so that the molecular chain of the polyester is highly oriented.

According to the present invention, the stretching ratio can be improved in the formation of a film, which renders the present invention useful for the production of a film and a tape of which high strength and high modulus of elasticity are required.

EXAMPLES

The present invention will now be described in detail with reference to the following Examples, though it is not limited to these Examples only. In the Examples, "part(s)" is intended to mean part(s) by weight unless otherwise specified.

EXAMPLE 1

3 parts of each of the additive compounds listed in Table 1 was added to 100 parts of a polyethylene terephthalate resin (J-055; manufactured by Mitsui PET Resin Co., Ltd.; $[\eta]=1.2$ dl/g), and the mixture thus obtained was dried at 140° C. for 10 hours in vacuo and melt-kneaded at 280° C. on a twin-screw extruder. The obtained strand was cooled with water and cut into pellets.

The obtained pellets were dried under the above-described drying conditions, preheated for 3 minutes on a laboratory press heated at 290° C., and pressed under a load of 150 kg/cm$^2$ for one minute to provide a filmy molding having a thickness of about 200 µm. A test piece having a size of 10 cm × 10 cm was cut from the molding, and subjected to simultaneous biaxial stretching at 90° C. on a biaxial stretching apparatus. When the stretching ratio became 90% of the maximum stretching ratio, the film thus obtained was heated to 210° C., and heat set at that temperature for one minute.

The maximum stretching ratio means the stretching ratio at a point of tensile rupture. In general, a film stretched by the biaxial stretching can constantly be obtained when the film is stretched at a stretching ratio of 90% of the maximum stretching ratio.

A rectangular test piece having a size of 5 mm × 50 mm and a test length of 20 mm was prepared from the stretched film. The maximum stress, elongation at break and modulus of elasticity of the test piece at a rate of pulling of 50%/min were determined with Tensilon UCT-100 manufactured by Orientec Co., Ltd. The results are given in Table 1.

Further, Table 1 shows the areal stretching ratio through simultaneously biaxial stretching, and film thickness and intrinsic viscosity of the obtained film, that is, the rectangular test piece.

The film thickness was measured at a temperature of 20°±15° C. and a relative humidity of 65±20% (See JIS C 2318).

The intrinsic viscosity of the obtained film was determined at 25° C. in phenol/tetrachloroethane (weight ratio of 60/40).

Comparative Example 1

A test was conducted in the same manner as that of Example 1, except that none of the invention compounds, that is, the additive compounds according to the present invention, was added to the polyethylene terephthalate resin. The results are also given in Table 1.

Comparative Example 2

A polyester film was produced in the same manner as that of Example 1, except that benzophenone was used instead of the invention compounds. The polyester film was tested in the same manner as that of Example 1. The results are also given in Table 1.

TABLE 1

|  | Additive compd. | Stretching ratio (areal ratio) | Film thickness ($\mu$m) | Max. stress (kg/mm$^2$) | Elongation at break (%) | Modulus of elasticity (kg/mm$^2$) | Intrinsic viscosity (dl/g) |
|---|---|---|---|---|---|---|---|
| Ex. 1 | Invention compd. (1) | 18.5 | 12 | 42.3 | 85 | 536 | 0.87 |
|  | Invention compd. (3) | 18.2 | 12 | 40.2 | 92 | 511 | 0.87 |
|  | Invention compd. (6) | 17.9 | 13 | 39.5 | 98 | 497 | 0.86 |
|  | Invention compd. (7) | 18.2 | 12 | 40.5 | 90 | 513 | 0.87 |
|  | Invention compd. (9) | 18.0 | 12 | 40.2 | 98 | 507 | 0.86 |
| Comp. Ex. |  |  |  |  |  |  |  |
| 1 | — | 12.3 | 19 | 31.0 | 146 | 430 | 0.86 |
| 2 | benzophenone | 13.5 | 17 | 32.5 | 139 | 445 | 0.86 |

EXAMPLE 2

The procedure of Example 1 was repeated by using the invention compound (1) except that the amount of addition of the additive compound was varied as specified in Table 2, The resultant films were tested in the same manner as that of Example 1. The results are given in Table 2.

TABLE 2

| Amt. of addition (pt.) | Stretching ratio (areal ratio) | Film thickness ($\mu$m) | Max. stress (kg/mm$^2$) | Elongation at break (%) | Modulus of elasticity (kg/mm$^2$) | Intrinsic viscosity (dl/g) |
|---|---|---|---|---|---|---|
| 1 | 15.5 | 16 | 37.5 | 114 | 478 | 0.87 |
| 5 | 20.5 | 10 | 41.3 | 95 | 508 | 0.86 |
| 10 | 24.6 | 8 | 33.7 | 135 | 452 | 0.86 |

EXAMPLE 3

Films were formed and evaluated in the same manner as those of Example 1, except that a polyethylene 2,6-naphthalate resin ($[\eta]=0.81$ dl/g) synthesized as described below was used as the polyester resin instead of the polyethylene terephthalate resin and the kneading temperature, press temperature, simultaneous biaxial film stretching temperature and heat setting temperature were 300° C., 300° C., 130° C. and 240° C., respectively.

The results of evaluation are given in Table 3.

[Preparation of Polyethylene 2,6-naphthalate resin]

Poly(ethylene 2,6-naphthalenedicarboxylate), that is, polyethylene 2,6-naphthalate resin, was prepared by stirring under heating a mixture of 146.4 g of dimethyl 2,6-naphthalenedicarboxylate, 74.4 g of ethylene glycol and 100 ppm of titanium from titanium tetraisopropoxide. Specially, the reaction was conducted as follows:

(1) The mixture was maintained under nitrogen at 190° C. for 1 hour, raised the temperature to 210° C., and maintained at 210° C. for 1 hour while distilling out methanol from the reaction system.

(2) The temperature was raised to 285° C., and then nitrogen was purged from the reaction system.

(3) The pressure of the reaction system was reduced and melt condensation was continued at 285° C. for 100 minutes under 0.2 mm of mercury pressure.

(4) Heating was stopped and the pressure of the reaction system was let down to atmospheric pressure with nitrogen.

Comparative Example 3

A test was conducted in the same manner as that of Example 3, except that none of the invention compounds was added to the polyethylene 2,6-naphthalate resin. The results are also given in Table 3.

TABLE 3

|  | Additive compd. | Stretching ratio (areal ratio) | Film thickness ($\mu$m) | Max. stress (kg/mm$^2$) | Elongation at break (%) | Modulus of elasticity (kg/mm$^2$) | Intrinsic viscosity (dl/g) |
|---|---|---|---|---|---|---|---|
| Ex. 3 | Invention compd. (1) | 16.3 | 16 | 70 | 93 | 672 | 0.63 |
|  | Invention compd. (3) | 16.1 | 17 | 69 | 94 | 654 | 0.62 |
|  | Invention compd. (6) | 15.8 | 17 | 69 | 97 | 648 | 0.63 |
|  | Invention compd. (7) | 16.1 | 17 | 70 | 94 | 663 | 0.63 |
|  | Invention compd. (9) | 16.0 | 17 | 69 | 95 | 659 | 0.62 |
| Comp. Ex. 3 | — | 13.2 | 21 | 51 | 123 | 531 | 0.63 |

The invention being thus described, it will be obvious that the same may be varied in many ways. Such variations are not to be regarded as a departure from the spirit and scope of the invention, and all such modifications as would be obvious to one skilled in the art are intended;to be included within the scope of the following claims.

What we claim is:

1. A process for producing a polyester film, which comprises preparing a polyester resin composition comprising, adding to a polyester resin, 0.1 to 10 parts by weight, based on 100 parts by weight of the polyester resin, of an additive compound selected from the group consisting of compounds represented by the following general formula (I):

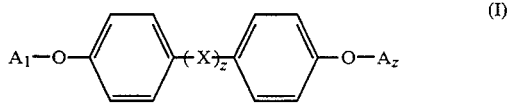

wherein $A_1$ and $A_2$ each stand for an alkyl or aralkyl group having 6 to 22 carbon atoms, X stands for

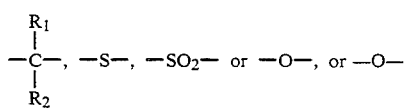

wherein $R_1$ and $R_2$ each stand for a hydrogen atom or an alkyl group having 4 or less carbon atoms, and z is 0 or 1, and compounds represented by the following general formula (II):

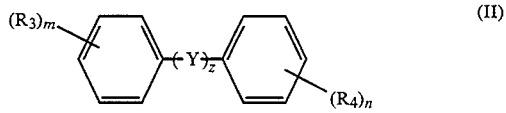

wherein $R_3$ and $R_4$ each stand for an alkyl group having 6 to 22 carbon atoms, m and n are each an integer capable of satisfying the requirement that m+n=1 to 3, Y stands for

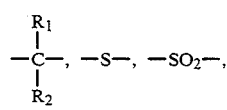

wherein $R_1$ and $R_2$ each stand for a hydrogen atom or an alkyl group having 4 or less carbon atoms, and z is 0 or 1, and subjecting a film made of the resin composition to biaxial stretching to obtain said polyester film.

2. The process for producing a polyester film according to claim 1, wherein the resin composition is prepared by adding the additive compound in the course of the production of the polyester resin.

3. The process for producing a polyester film according to claim 1, wherein the resin composition is prepared by melt blending the additive compound with the polyester resin.

4. The process for producing a polyester film according to claim 1, wherein the resin composition is prepared by dry blending the additive compound with the polyester resin.

5. The process for producing a polyester film according to claim 1, wherein the biaxial stretching is conducted at an areal stretching ratio of 4 to 30.

6. The process for producing a polyester film according to claim 1, wherein the biaxial stretching is conducted at an areal stretching ratio of 9 to 30.

7. The process for producing a polyester film according to claim 1, wherein the additive compound is a compound represented by the general formula (I).

8. The process for producing a polyester film according to claim 1, wherein the polyester resin is one member selected from the group consisting of polyethylene terephthalate, poly-1,4-butylene terephthalate, polyethylene 2,6-naphthalate, polycyclohexanedimethanol terephthalate, poly-1,4-butylene biphenyl-4,4'-dicarboxylate, poly-1,3-propylene terephthalate and poly-1,6-hexylene terephthalate.

9. The process for producing a polyester film according to claim 1, wherein Y in the general formula (II) stands for

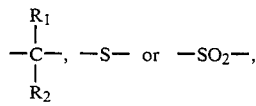

wherein $R_1$ and $R_2$ each stand for a hydrogen atom or an alkyl group having 4 or less carbon atoms.

10. The process for producing a polyester film according to claim 1, wherein Y in the general formula (II) stands for

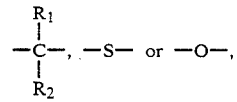

wherein $R_1$ and $R_2$ each stand for a hydrogen atom or an alkyl group having 4 or less carbon atoms.

11. The process for producing a polyester film according to claim 1, wherein Y in the general formula (II) stands for

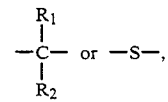

wherein $R_1$ and $R_2$ each stand for a hydrogen atom or an alkyl group having 4 or less carbon atoms.

12. The process for producing a polyester film according to claim 1, wherein $R_3$ and $R_4$ in the general formula (II) each stand for an alkyl group having 9 to 22 carbon atoms when Y in the general formula (II) stands for $—SO_2—$.

13. The process for producing a polyester film according to claim 1, wherein $R_3$ and $R_4$ in the general formula (II) each stand for an alkyl group having 10 to 22 carbon atoms when Y in the general formula (II) stands for $—SO_2—$.

14. A polyester film produced by the process as set forth in claim 1.

15. The polyester film according to claim 14, wherein the polyester is polyethylene terephthalate or polyethylene 2,6-naphthalate.

16. A polyester film having a high strength and a high modulus of elasticity which comprises a polyester resin and 0.1 to 10 parts by weight, based on 100 parts by weight of the polyester resin, of an additive compound selected from the group consisting of compounds represented by the following general formula (I):

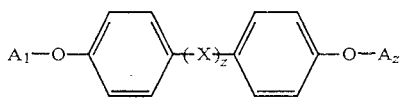 (I)

wherein $A_1$ and $A_2$ each stand for an alkyl or aralkyl group having 6 to 22 carbon atoms, X stands for

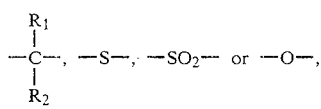

wherein $R_1$ and $R_2$ each stand for a hydrogen atom or an alkyl group having 4 or less carbon atoms, and z is 0 or 1, and compounds represented by the following general formula (II):

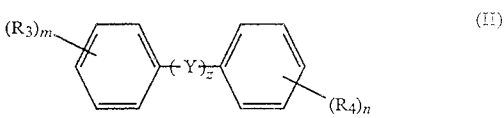 (II)

wherein $R_3$ and $R_4$ each stand for an alkyl group having 6 to 22 carbon atoms, m and n are each an integer capable of satisfying the requirement that m+n=1 to 3, Y stands for

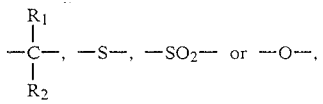

wherein $R_1$ and $R_2$ each stand for a hydrogen atom or an alkyl group having 4 or less carbon atoms, and z is 0 or 1, wherein said polyester film is obtained via biaxial stretching of a film made from said resin and said additive compound.

* * * * *